March 20, 1928.
J. LUCAS
1,662,931
HARNESS MECHANISM FOR LOOMS
Filed Sept. 18, 1926     2 Sheets-Sheet 1
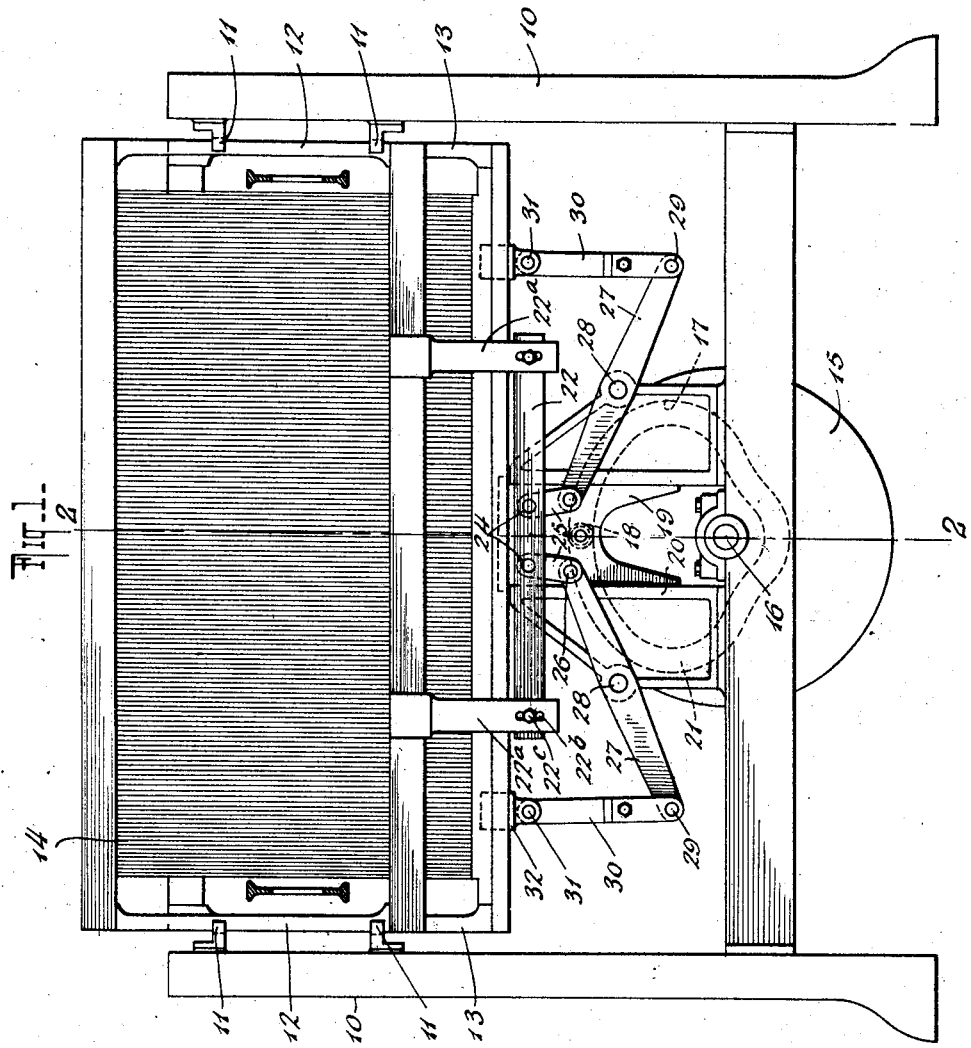
INVENTOR
JONATHAN LUCAS
BY
ATTORNEY March 20, 1928.
J. LUCAS
1,662,931
HARNESS MECHANISM FOR LOOMS
Filed Sept. 18, 1926
2 Sheets-Sheet 2
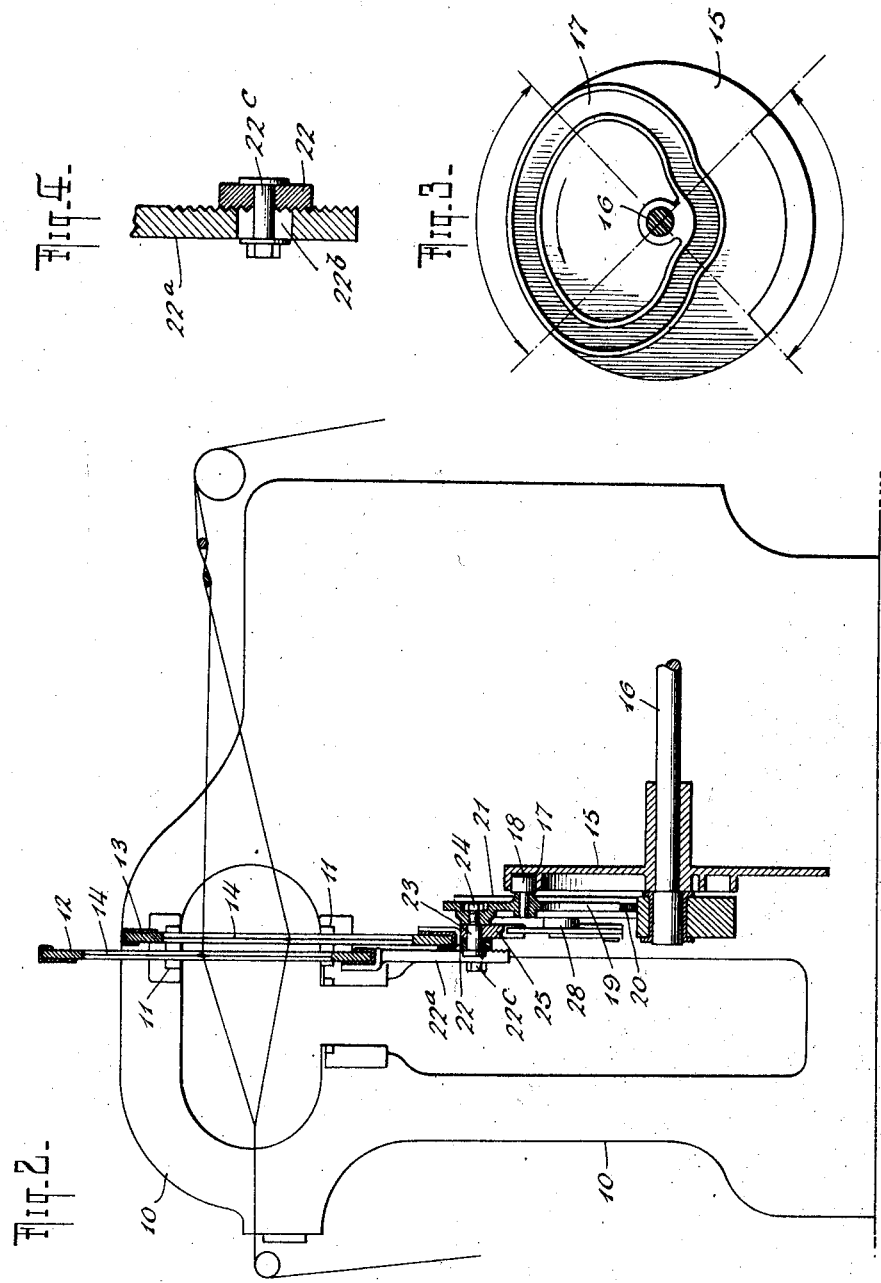
INVENTOR
JONATHAN LUCAS
BY
ATTORNEYS Patented Mar. 20, 1928.

1,662,931

UNITED STATES PATENT OFFICE.

JONATHAN LUCAS, OF SAVANNAH, GEORGIA, ASSIGNOR TO LUCAS-LAMBORN-LOOM CORPORATION, OF NEW YORK, N. Y., A CORPORATION OF NEW YORK.

HARNESS MECHANISM FOR LOOMS.

Application filed September 18, 1926. Serial No. 136,256.

The invention relates to looms for weaving fabrics and the like, and more particularly to the harness mechanism thereof, and has for its object to provide a simple mechanism whereby the harness frames are operated positively in an efficient manner. Other more specific objects will appear from the description hereinafter, and the features of novelty will be pointed out in the claims.

In the accompanying drawings, which illustrate an example of the invention without defining its limits, Fig. 1 is an elevation illustrating the invention; Fig. 2 is a vertical section on the line 2—2 of Fig. 1; Fig. 3 is a face view of the operating cam illustrated in the drawings and Fig. 4 is a detail view showing adjustable connections between the harness frames and the mechanism.

In the drawings, 10 represents an upright frame constituting part of a loom and including grooved lugs 11 in which the harness frames 12 and 13 are vertically slidable. The harness frames themselves may be of any usual construction and include heddles 14 arranged in the conventional manner. The essential feature of the invention consists in providing a single mechanical or power element and cooperating mechanism whereby the mechanical motion of said member is translated into a vertical reciprocation of the harness frames in inverse relation. In the illustrated example, the mechanical or power member referred to is shown in the form of a cam 15 carried by a shaft 16 journalled in suitable bearings and connected in any suitable manner with a source of power. Upon one of its faces, the cam is provided with a cam groove 17 designed to bring about a rise of the harness frames throughout ninety degrees of its motion, a dwell throughout the succeeding ninety degrees of its movement, a fall of said harness frames throughout the next succeeding ninety degrees of its motion and another dwell throughout the remaining ninety degrees of its rotation. The cam groove 17 accommodates a roller 18 journalled upon a slide 19 capable of being vertically reciprocated in guides 20 forming part of a sub-frame 21 mounted upon the frame 10 at the proper point. The slide 19 is connected directly and positively with the harness frame 12 in any convenient manner as, for instance, by means of a cross-bar 22 mounted upon members 22ª depending from the frame 12; in the preferred construction the bar 22 is adjustably connected with the members 22ª as shown in Fig. 1 of the drawings. To effect the aforesaid adjustable connection the members 22ª may be provided with slots 22ᵇ for the accommodation of bolts 22ᶜ, secured in place by means of suitable nuts or otherwise. The connection between the cross-bar 22 and the slide 19 is effected, in the illustrated example, through the medium of bolts 23 secured in place by means of nuts 24 countersunk in suitable recesses in the slide 19 as illustrated in Fig. 2. The harness frame 13 is connected with said slide 19 by means of links 25, each of which is pivotally connected at one end either directly with the slide 19 or with the bracket 22, or for instance with the bolts 23 as shown in Figs. 1 and 2; the other end of each link 25 is pivotally connected at 26 with one end of a rocking lever 27 fulcrumed at 28 upon the sub-frame 21. At their opposite ends, the levers 27 are pivotally connected at 29 with connecting rods 30 which, in turn, are pivotally connected at 31 with lugs 32 secured to the harness frame 13; for the purposes of adjustment the rods 30 may be adjustable as to length as indicated in Fig. 1.

Assuming the parts to be in the position illustrated in Fig. 1 of the drawings, and assuming that the cam 15 is being driven, the slide 19 will, at the proper time, be moved downwardly in the guides 20 and will, through the medium of the connections 22, 22ª, etc., directly transmit this downward movement to the harness frame 12 which accordingly will move downwardly in the guides 11. At the same time, the slide 19 will cause the links 25 to descend and thereby to rock the levers 27 in a manner to cause the connecting rods 30 to exert an upward push upon the harness frame 13 which accordingly will be moved upwardly in its guides 11. As the rotation of the cam 15 continues, the slide 19 will finally be moved upwardly in the guides 20 and consequently will move the harness frame 12 upwardly and at the same time, through the medium of the links 25, the levers 27 and connecting rods 30, will cause the harness frame 13 to move downwardly. It will thus be seen that the mechanical movement of the power member or, specifically expressed, the rotative movement of the cam 15, is translated by the connecting mechanism as represented by the bar 22 and its associated elements and the links 25, levers 27 and connecting rods 30 into a vertical reciprocation of the harness frames 12 and 13, this vertical reciprocation being in inverse relation with respect to said frames.

The improved arrangement reduces the harness mechanism of a loom to the simplest point and does away with all of the customary impositive connections, and results in an efficient two-harness motion from a single mechanical or power member or specifically from a single-face cam. The invention does away with all of the objections found in existing harness arrangements and provides a harness motion which is positive in action and uniform in its mechanical motion at all times. As a result of this, the shed of warp threads is mechanically operated in an absolutely efficient and reliable manner and the warp threads are reversed in the shed in uniform and positive successive steps. It will, of course, be understood that the arrangement is such that the harness frames 13 and 14 are operated in synchronism with the remainder of the loom mechanism so as properly to reverse the positions of the warp threads in harmony therewith.

Various changes in the specific form shown and described may be made within the scope of the claims without departing from the spirit of my invention.

I claim:

1. In a loom the combination of a pair of vertically movable harness frames, a vertically movable slide connected directly with one of said harness frames, a rocking lever pivotally connected with said slide and with the other harness frame, and a cam operatively connected with said slide for reciprocating the same to bring about a vertical reciprocation of said harness frames in inverse relation.

2. In a loom, the combination of a pair of vertically movable harness frames, a vertically movable slide, a bracket connected directly with one of said harness frames and with said slide to partake of the movements of the latter, a pair of rocking levers each having one end connected with said slide and their other ends connected with the other harness frame, and a single cam operatively connected with said slide for reciprocating the latter thereby to reciprocate the harness frames in inverse relation.

3. In a loom, the combination of a pair of vertically movable harness frames, a power driven cam, a direct connection between said cam and one of said frames for lifting and lowering said frame from below, and mechanism extending between said connection and the bottom of the other frame whereby the lifting movement of the first mentioned frame is translated into a lowering movement in the second frame and vice versa, and said frames are vertically reciprocated in inverse relation.

4. In a loom, the combination of fixed guiding means, a pair of frames vertically movable in said guiding means, guides below said frames, a slide vertically movable in said guides, a cam operatively connected with said slide for vertically reciprocating the same, and connections from said slide to the lower portions of said harness frames whereby the latter are lifted and lowered from below in said guiding means in inverse relation.

5. In a loom, the combination of a pair of vertically movable harness frames, a vertically movable slide connected with one of said harness frames, a pair of rocking levers each having one end connected with said slide and their other ends connected with the other harness frame, and a single cam operatively connected with said slide for reciprocating the latter thereby to reciprocate the harness frames in inverse relation.

In testimony whereof I have hereunto set my hand.

JONATHAN LUCAS.